Nov. 30, 1948.   H. B. CONANT   2,454,776
INDICATING CIRCUIT FOR ALTERNATING-CURRENT BRIDGES
Filed June 8, 1945

Inventor
Harold B. Conant,
By Strauch & Hoffman
Attorneys

Patented Nov. 30, 1948

2,454,776

UNITED STATES PATENT OFFICE 2,454,776

INDICATING CIRCUIT FOR ALTERNATING-CURRENT BRIDGES

Harold B. Conant, Lincoln, Nebr.

Application June 8, 1945, Serial No. 598,393

2 Claims. (Cl. 171—95)

This invention relates generally to alternating-current indicating circuits and particularly concerns rectifier type circuits for indicating conditions of electrical balance and unbalance in an alternating-current balanced bridge.

For purpose of such indications, the usual alternating-current meter presents certain difficulties, particularly in indicating balanced conditions as by the null or zero deflection method. To overcome these difficulties, it has been proposed to use rectifier type meter circuits with a direct-current meter because the direct-current meter provides an indication of the direction of an unbalanced condition, a phase relationship, and generally has greater sensitivity.

The rectifier type meter circuits heretofore proposed are not particularly applicable as indicators in balanced bridge circuits. Previous efforts to provide a meter circuit for a bridge have resulted in circuits where the meter is operative during only a part of each cycle of the alternating-current source or have failed to maintain the balanced characteristics of the bridge circuit.

It is a major object of this invention to provide improved apparatus for indicating a condition of electrical unbalance in an alternating-current circuit.

An important object of the invention is to provide a rectifier type meter indicating circuit which operates during a full cycle of the energy source in an alternating-current bridge circuit.

Another object of the invention is to provide a balanced meter indicating circuit for an alternating-current bridge.

A further object of the invention is to provide an improved circuit for indicating the direction and magnitude of electrical unbalance between two points in an alternating-current circuit.

A specific object of the invention is to provide an indicating circuit having a direct-current instrument for indicating the direction and magnitude of the differential voltage between two points in an alternating-current circuit.

Other objects and advantages of the invention will become apparent from the following specification taken in connection with the accompanying drawing, wherein.

According to the invention in its preferred form, a condition of electrical balance or unbalance between two terminals of an alternating-current energized circuit may be indicated by connecting a voltage divider and a rectifier in a balanced circuit between the terminals so a condition of unbalance creates a difference between the direct currents flowing in two halves of the voltage divider. A direct-current meter connected to the balanced circuit for measuring potential difference across corresponding portions of the two halves of the voltage divider resulting from the difference in the direct-currents will indicate the direction and magnitude of the unbalanced condition.

Figure 1:
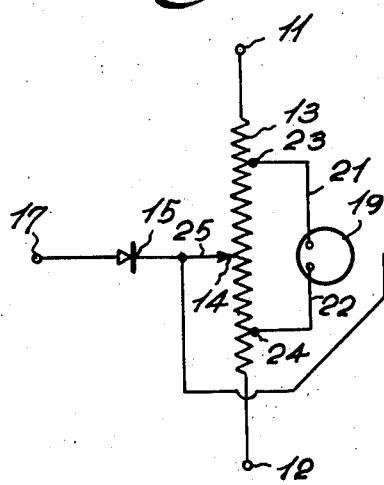
Figure 1 is a schematic diagram of an indicating circuit embodying the invention.

Referring now to Figure 1, the invention is shown as incorporated in a circuit for indicating the voltage differential between terminals 11 and 12. An impedance in the form of a voltage divider 13 is connected between the terminals 11 and 12 and has its midpoint 14 connected through rectifier 15 to a terminal 17. The terminal 17 is adapted to be connected to the source of alternating-current potential applied to the circuit into which terminals 11 and 12 are connected.

When the circuit is connected in this manner, unidirectional currents will flow through the two halves of the voltage divider 13 on opposite sides of the mid-point 14 during alternate half cycles of the alternating-current voltage of the circuit. The difference between these unidirectional currents will correspond to the alternating-current voltage unbalance between terminals 11 and 12 as determined by the direction and magnitude of the voltage differential between the terminals 11 and 12.

If it is desired to have a unidirectional current flow in the voltage divider during both halves of a cycle of the applied alternating-current voltage, a second rectifier 16 may be connected between the midpoint 14 and a terminal 18, which, like the terminal 17, is to be connected to the source of alternating-current energy which supplies the circuit.

A galvanometer or other direct-current responsive instrument 19 has its terminals connected as by leads 21 and 22 to points 23 and 24 on the voltage divider 13. The points 23 and 24 are equally spaced on opposite sides of the midpoint 14, which is selected as the electrical center of the voltage divider.

In order to adjust slider 25 to a position which corresponds to the electrical center of the voltage divider, terminals 11 and 12 are connected together to one terminal of a low voltage source of alternating current and terminals 17 and 18 are connected together to the other terminals of that source. With these connections, the slider 25 is adjusted until the galvanometer 19 has a zero reading.

After the slider has been thus adjusted, the reading of galvanometer 19 will depend solely upon the potential difference across corresponding portions of the two halves of the voltage divider 13.

Figure 2:
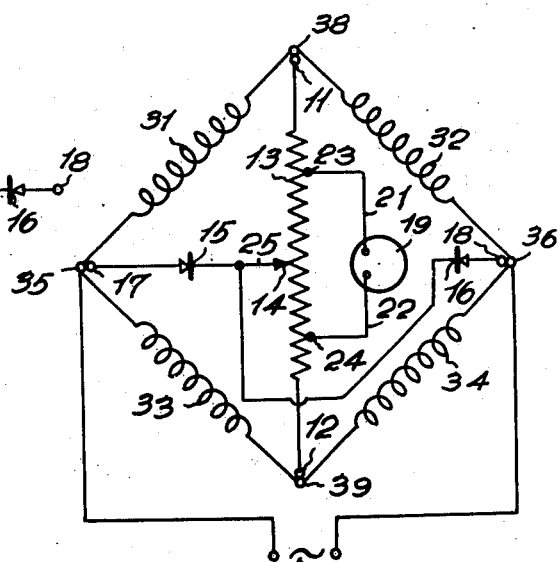
Figure 2 is a schematic diagram of a standard alternating-current bridge having the indicating circuit of Figure 1 incorporated therein for indicating the magnitude and direction of the voltage differential between opposite terminals of the bridge.

In Figure 2, there is shown a standard balanced alternating-current bridge circuit composed of four impedances 31, 32, 33 and 34 connected in a conventional Wheatstone bridge with one pair of opposite terminals 35 and 36 connected to a source 37 of alternating-current energy.

The indicating circuit, according to the present invention, has its terminals 11 and 12 connected to the other pair of opposite terminals 38 and 39 of the Wheatstone bridge so the voltage divider 13 is connected directly between these opposite terminals of the bridge. Terminals 17 and 18 of the voltmeter circuit are connected to the source 37 through opposite terminals 35 and 36 of the bridge. Assuming the slider 25 has been adjusted to the electrical center of the potentiometer 13, the direction and magnitude of the deflection of the galvanometer 13 will provide an indication of the direction and magnitude of the voltage unbalance between terminals 38 and 39 of the bridge because the potential difference across corresponding portions of the two halves of the voltage divider 13 depends upon this unbalance.

Although the circuits of Figures 1 and 2 are workable with only one rectifier, the use of the two rectifiers 15 and 16 provides full-wave rectification. This doubles the accuracy of the meter because the unidirectional current is conducted through the voltage divider during both halves of a cycle of the alternating source 37.

Rectifier 15 allows current to flow from the center connection on the voltage divided to both ends of same and thence through arms 32 and 34 during one half cycle and during the opposite half cycle the current path is through rectifier 16, the voltage divider and arms 31 and 33. Both rectifiers are operated by the voltage drop across the entire system and assuming the bridge is in perfect balance the currents through the two halves of the voltage divider are equal and zero potential difference exists between terminals 38 and 39 and also between terminals 23 and 24. This is advantageous because, even under such a condition of perfect balance, considerable current is being handled by the rectifiers so they operate on an efficient part of their current density curve, thereby indicating the smallest deviation from the balanced condition.

Figure 3:
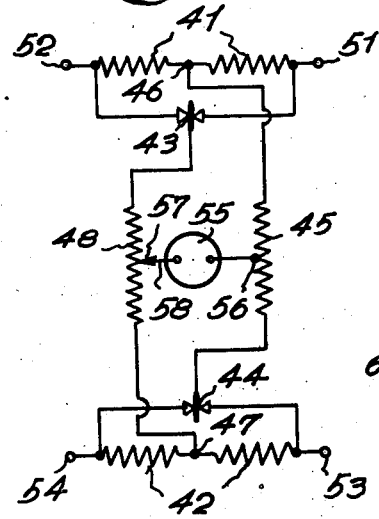
Figure 3 is a schematic diagram of a modified indicating circuit embodying the invention.

Figure 3 shows a modified circuit for indicating conditions of electrical balance or unbalance in an alternating-current circuit. This is accomplished by connecting a pair of known impedances 41 and 42 in the circuit at points between which the balanced condition is to be indicated. These impedances 41 and 42 have rectifiers 43 and 44 connected across them, respectively. In this case, which is preferred, the rectifiers are shown as full-wave rectifiers although half-wave rectifiers may be used in cases where maximum accuracy is not essential. A first voltage divider 45 is connected between midpoint 46 of the impedance 41 and the rectifier 44 which is connected across the impedance 42. To complete the balanced circuit, a second voltage divider 48 is connected from the midpoint 47 of the impedance 42 to the rectifier 43.

As will be apparent from an inspection of Figure 3, unidirectional currents will flow through the voltage dividers 45 and 48 in opposite directions. The difference between these currents will correspond to the difference between the alternating currents through the impedances 41 and 42, which are adapted to be connected by terminals 51, 52 and 53, 54 into the circuit in which balanced and unbalanced conditions are to be indicated.

For purposes of indicating the difference between the currents through the voltage dividers 45 and 48, a galvanometer 55 is connected between corresponding points 56 and 57 of the voltage dividers 45 and 48.

To balance the circuit shown in Figure 3, the terminals 51 and 53 are connected together to one side of a source of alternating-current potential and the terminals 52 and 54 are connected to the other side of that source. Slider 58 is then adjusted until a null reading is obtained on the galvanometer 55. When this occurs, the slider 58 will be adjusted to the point 57 on the voltage divider 48 which corresponds to point 56 on the voltage divider 45 to which the galvanometer is connected.

Figure 4:
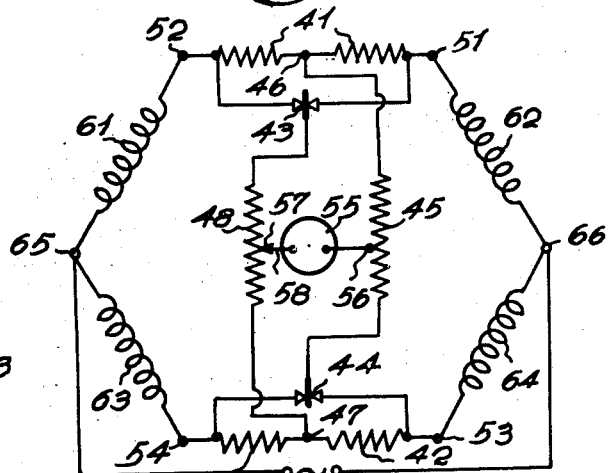
Figure 4 is a schematic diagram of a standard alternating-current bridge with the indicating circuit of Figure 3 incorporated therein for indicating balanced and unbalanced conditions of the bridge.

In Figure 4, the indicating circuit of Figure 3 is shown connected into a standard balanced alternating-current bridge circuit composed of four impedances 61, 62, 63 and 64. One pair of opposite terminals 65 and 66 of the bridge circuit is connected to a source 67 of alternating-current potential. The terminals 51 and 52 at the ends of impedance 41 are connected into the bridge circuit between impedances 61 and 62. Similarly, terminals 53 and 54 at the ends of impedance 42 are connected between impedances 63 and 64 of the bridge. With this arrangement, the galvanometer indicates conditions of balance as well as the direction and magnitude of any electrical unbalance between opposite points of the Wheatstone bridge circuit. Assuming the slider 57 has been properly adjusted, the magnitude and direction of the deflection of the galvanometer 55 will correspond to the magnitude and direction of the unbalanced condition of the bridge which is obtained by measuring the difference between the alternating currents in the conductor connecting bridge impedance elements 61 and 62 and the conductor connecting bridge impedance elements 63 and 64.

The form of the invention illustrated in Figures 3 and 4 is preferred in case it is not desirable to have the rectifier-voltage divider circuit connected in parallel with any arm of the bridge. In this circuit the voltage drop across resistors 41 and 42 is utilized to saturate the rectifiers for efficient operation, the resultant direct current from rectifiers 43 and 44 being applied to the voltage dividing resistors. Any difference in current through either resistor 41 or 42 will cause a different voltage to be applied to the rectifier but the change in current through either section of the voltage divider will be determined by the potential difference resulting between the rectifiers and the center taps on resistors 41 and 42.

In both forms of the invention conditions of electrical balance or unbalance are indicated by connecting a voltage divider between opposite terminals of the bridge with a suitable rectifier between this voltage divider and the source of current applied to the bridge. By using full-wave rectifiers, the unidirectional current passes through the voltage dividers during both halves of the cycle of the alternating voltage from the source connected to the bridge, thus greatly increasing the accuracy of meter readings.

By my invention, it is possible to utilize the advantages of a direct-current responsive instrument to obtain improved indications of the direction and magnitude of a condition of electrical unbalance in an alternating-current circuit. This is especially advantageous in the case of a balanced alternating-current bridge circuit because the meter circuit embodying my invention is also a balanced circuit. Both modifications of the invention have balanced meter circuits including a direct-current responsive instrument, the deflection of which depends upon electrical unbalance in an alternating-current circuit.

These indicating circuits may be exactly balanced by adjusting them for a null reading of the instrument. This is accomplished before connecting the meter into the bridge circuit. Therefore, any deflection of the instrument after being connected to the bridge must be due to an unbalanced condition in the bridge itself. By the provision of these balanced indicating circuits, the deflection of the instrument is not affected by ambient temperature changes or by variations in the wave form or amplitude of the supply voltage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An alternating-current bridge circuit comprising a plurality of impedances arranged with one pair of opposite terminals adapted to be connected to a source of alternating-current energy, a voltage divider connected to a second pair of opposite terminals of said bridge circuit, a rectifier connected between the electrical center of said voltage divider and at least one of said first pair of terminals, and a direct-current responsive instrument connected to said voltage divider at points equally spaced on opposite sides of said electrical center.

2. An alternating-current bridge circuit comprising a plurality of impedances arranged with one pair of opposite terminals adapted to be connected to a source of alternating-current energy, a voltage divider connected to a second pair of opposite terminals of said bridge circuit, a full-wave rectifier connected between the electrical center of said voltage divider and said first pair of terminals whereby unidirectional currents between said source and said second pair of terminals traverse said voltage divider during both halves of a cycle of said alternating-current energy, and a direct-current responsive instrument connected to said voltage divider at points equally spaced on opposite sides of said electrical center.

HAROLD B. CONANT.

REFERENCES CITED

The following references are of record in the file of this patent:

UNITED STATES PATENTS

| Number | Name | Date |
| --- | --- | --- |
| 1,964,141 | Rhodes et al. | June 26, 1934 |
| 1,985,095 | Hoare | Dec. 18, 1934 |
| 2,240,184 | Hathaway | Apr. 29, 1941 |